Figure 1:
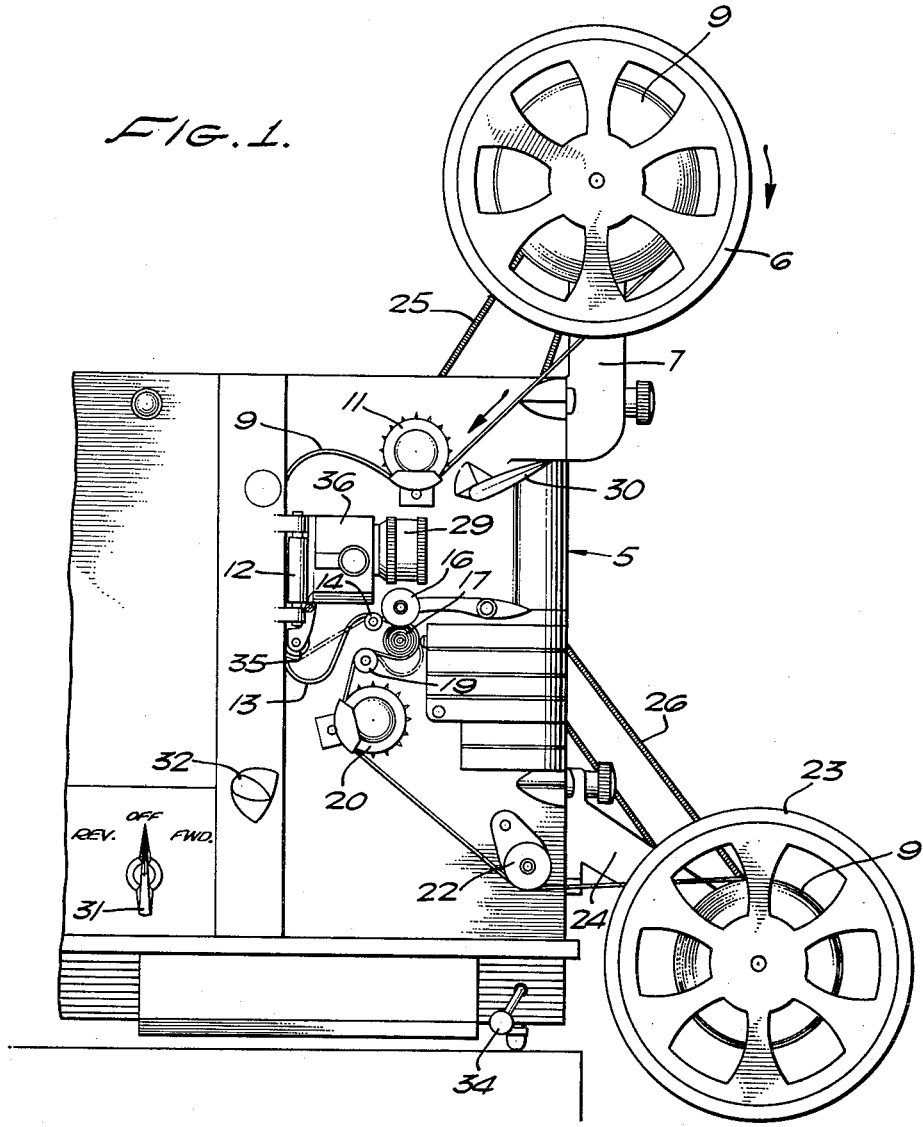

Jan. 9, 1962   M. E. ECKER ET AL   3,016,211
AUTOMATIC FLYWHEEL DRIVING MECHANISM
Filed Nov. 25, 1959   3 Sheets-Sheet 1

MARIO E. ECKER
JOHN J. HOEHN
INVENTORS

BY
ATTORNEY

Jan. 9, 1962 M. E. ECKER ET AL 3,016,211
AUTOMATIC FLYWHEEL DRIVING MECHANISM
Filed Nov. 25, 1959 3 Sheets-Sheet 2

MARIO E. ECKER
JOHN J. HOEHN
INVENTORS

ATTORNEY

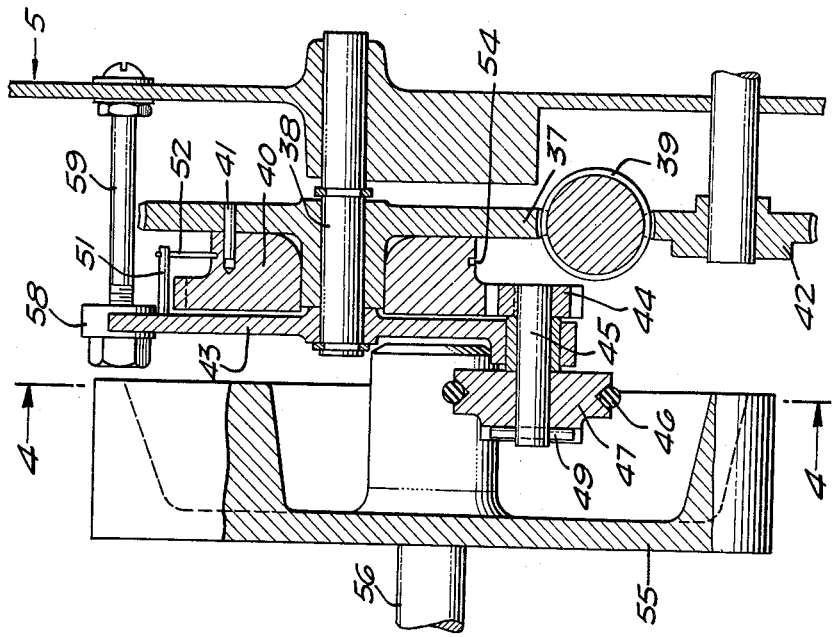
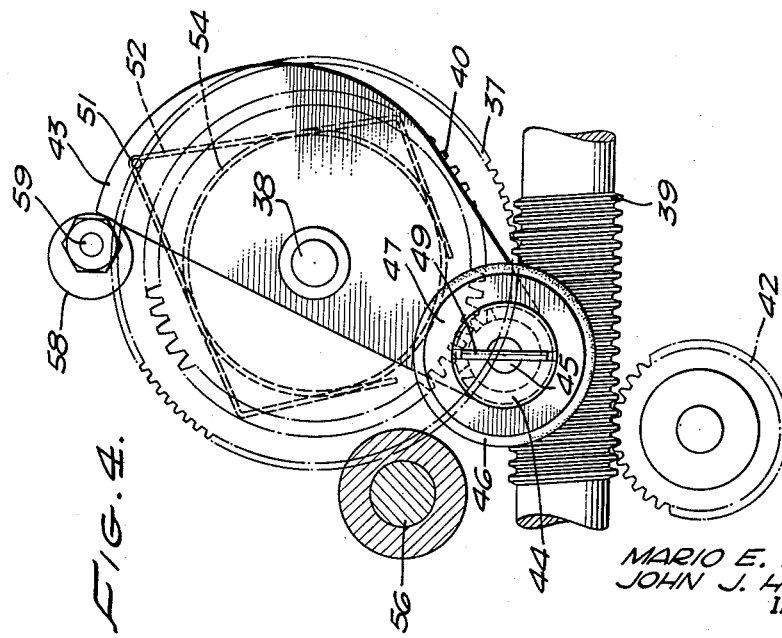

United States Patent Office 3,016,211
Patented Jan. 9, 1962

3,016,211
AUTOMATIC FLYWHEEL DRIVING MECHANISM
Mario E. Ecker and John J. Hoehn, Pennsauken, N.J., assignors to Radio Corporation of America, a corporation of Delaware
Filed Nov. 25, 1959, Ser. No. 855,387
9 Claims. (Cl. 242—55.12)

This invention relates to sound motion picture film projectors, and particularly to a flywheel driving mechanism for a reversible sound film projector which may be reversed at any time to repeat certain sections of the motion picture film.

In sound motion picture projectors, the film is continuously advanced at certain points by sprockets having teeth which enter the film perforations. For projecting the picture, the film is advanced intermittently through a picture light path and is advanced continuously past a sound track detector, the latter being either a photoelectric cell receiving light variations or a magnetic reproducing head receiving magnetic variations. To obtain a constant film speed at the sound translation point, a sound stabilizer drum with a flywheel of substantial weight mounted on the drum shaft is used to filter out minute, irregular film movements at the translation point, the sound drum and flywheel being driven, as a unit, by the pull of the film over the sound drum.

When the projector is reversed, the film sprockets and the intermittent claw mechanism are reversed immediately. However, when the projector stops, the inertia of the flywheel continues to drive the sound drum, which takes up the film in the free film loop between the intermittent mechanism and the sound drum. Any attempt, therefore, to operate the projector in reverse with the shortened, free, film loop results in an unstable film passage over the sound drum and disengagement of the sprocket holes in the film from the intermittent claw. Many times, this causes damage to the film. The present invention corrects this condition by positively driving the sound drum in reverse when the film direction is reversed, and at a faster speed than the normal film advancement, so as to re-establish the free film loop between the sound drum and the intermittent claw mechanism.

The mechanism for positively driving the film drum and flywheel in reverse is automatic to the extent that the positive drive is connected immediately to the film drum and flywheel upon reversal of the film transport mechanism and is released automatically from the positive drive when the mechanism is reversed again to drive the film in its normal direction.

The principal object of the invention, therefore, is to provide, in a sound motion picture projector, improved film driving mechanism which will facilitate the reversal of a sound motion picture film advancing mechanism embodying a film-pulled drum and flywheel.

Another object of the invention is to provide an improved reversing mechanism for a film-pulled drum and flywheel of a sound motion picture projector.

A further object of the invention is to provide, between the film transport mechanism and a drum and flywheel combination for a motion picture projector, an improved, automatic, positive drive coupling mechanism which becomes operative when the projector is conditioned to drive the film in a reverse direction, and an automatic release of the aforementioned positive drive coupling mechanism when the film is again reversed to be advanced in its normal, forward direction.

Figure 2:
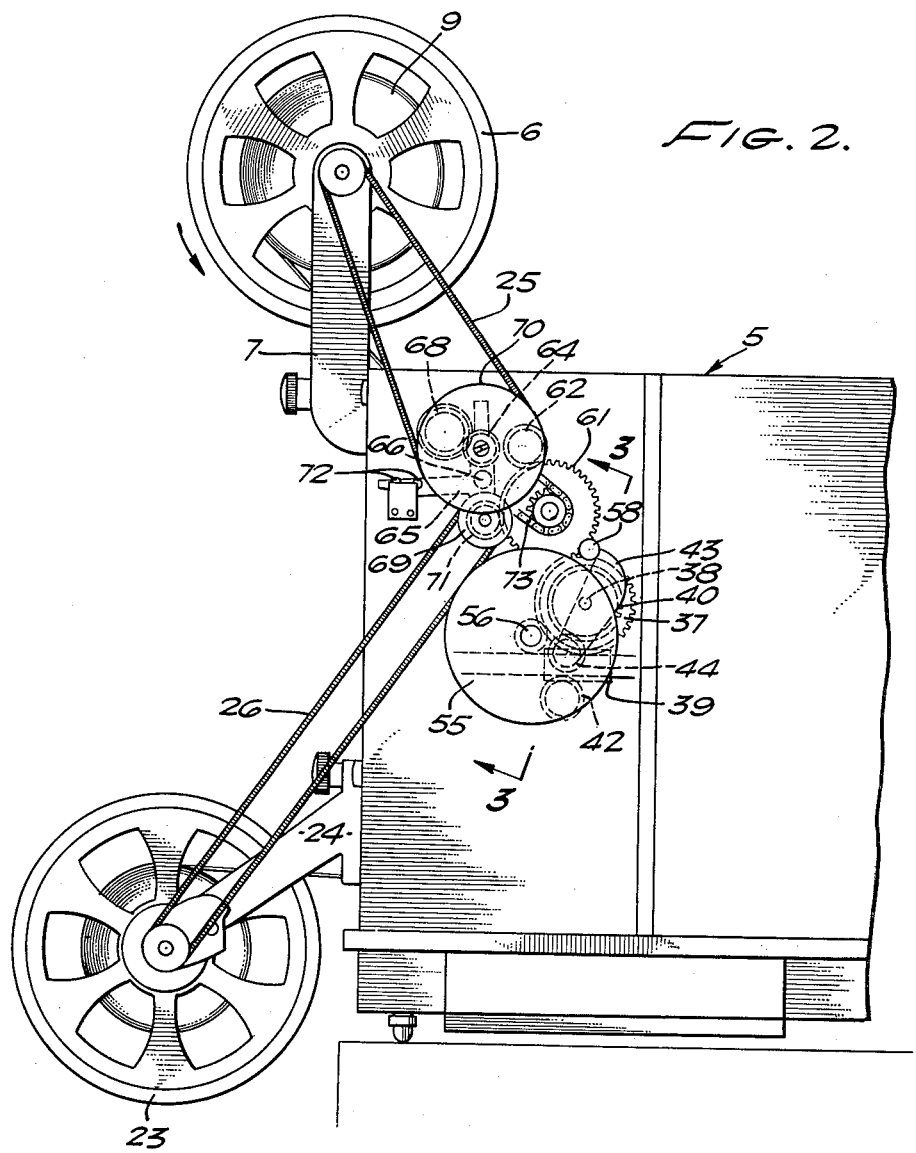

A better understanding of this invention may be had from the following detailed description when read in connection with the accompanying drawings, in which:

FIG. 1 is an elevational front view of a sound motion picture projector embodying the invention;
FIG. 2 is a rear elevational view of the projector of FIG. 1 showing the drive mechanism for the projector;
FIG. 3 is an enlarged cross-sectional view taken along the line 3—3 of FIG. 2; and
FIG. 4 is a front view of the mechanism shown in FIG. 3 taken along the line 4—4 of FIG. 3.

Referring, now, to the drawings in which the same reference numerals identify the same elements, a projector casing 5 has mounted on the top thereof a film reel 6 on a bracket 7, a roll of film 9 being shown on the reel and advanced in the direction of the arrow for normal, or forward, operation. The film 9 passes under a sprocket 11, past an intermittent feed mechanism at a gate 12, into a free loop 13, over a guide roller 14, under a pressure roller 16, over a film-pulled drum 17, over a tension roller 19, around a sprocket 20, and around a tension roller 22 to a takeup reel 23 mounted on a bracket 24. The reel 6 is driven by a spring belt 25 when the film is rewound, and the reel 23 is driven by a spring belt 26 during normal operation.

Other elements of the projector shown are a projection lens 29, a rewind lever 30, a motor switch 31 for the film advancing mechanism, and a speed selector knob 32. An amplifier and lamphouse are within the left side of the projector, and a tilting mechanism handle 34 is provided at the lower right-hand corner of the projector. A safety loop roller 35 is mounted on the lens barrel 36.

The normal position of the film 9 in the projector is as shown by the full lines in FIG. 1. In this position, the free loop 13 exists between the gate 12, where the intermittent motion takes place, and the sound drum 17, where the film moves continuously and uniformly, while the film is in tension between the drum 17 and the sprocket 20 over tension roller 19. If the film transport mechanism were stopped in the absence of a drive coupling mechanism according to the present invention, the film would take the position shown by the dotted lines and be under tension between the bottom of the gate 12 and the drum 17 and forced into a free loop between the drum 17 and sprocket 20. Furthermore, if the transport mechanism were then reversed, the tension in the film between the intermittent mechanism and the drum 17 would not be relieved, resulting in unstable film feed over the drum 17, and the loose loop 13 would not be re-established. The film would be pulled out of position in the lens gate so that the intermitent claw could not engage the sprocket holes of the film.

Referring, now, to FIG. 2, the basic elements of the film transport mechanism provided with a drive coupling mechanism according to the present invention are shown, the details thereof being shown in the copending application of Mario E. Ecker and John A. Liggett, Serial No. 855,386 filed November 25, 1959. The projector includes a drive motor (not shown) which drives a worm 39 in mesh with a gear 42 for driving the sprocket 20 and in mesh with a gear 37 on a shaft 38. A gear 40 is secured to the gear 37 by a pin 41 so that it rotates therewith (see FIG. 3). Free to rotate on the shaft 38 is an arm 43, this arm maintaining a gear 44 in mesh with the gear 40. Mounted on a shaft 45 of the gear 44 is a puck having a rubber O-ring 46 mounted in the groove of a wheel 47 which is held on the shaft 45 by a pin 49. At the opposite end of the arm 43 from the gear 44 is a pin 51 coupled to a spring clamp 52 that rides in a groove 54 on the hub of the gear 40.

When the gear 40 is reversed from normal, or forward, projection direction, the spring clamp 52 imparts a tangential force on the pin 51 to pivot the arm 43 clockwise (as viewed in FIG. 4) about the shaft 38. The arm 43 thus moves the puck 46—47 into contact with the hub of a flywheel 55 mounted on a shaft 56 which also carries the drum 17, so that the drum and the flywheel constitute a unitary combination. This connection results in the flywheel 55 being positively driven through gear 40, gear 44, and puck 46—47. When the worm 39 is rotated in the opposite direction so as to cause advancement of the film in the normal, forward direction, the arm 43 is rotated counterclockwise (as viewed in FIG. 4), that is, in the opposite direction to that just described, and the puck 46—47 is removed from contact with the hub of the flywheel 55. By the appropriate ratio of the gears between the worm 39 and the puck 46—47, the drum and flywheel unit are driven in reverse speed about 25% faster than when running in the forward direction. By this faster drive, the free loop 13 between the drum 17 and intermittent feed mechanism at the gate 12 is re-established, while the loop between the drum 17 and the sprocket 20 is removed. To provide the proper contact between the puck 46—47 and the hub of the flywheel 55, an eccentrically mounted disc 58 on a shaft 59 may be employed to adjust the position of the arm 43.

In the above copending application assigned to the same assignee as the present invention, the details of the mechanism driving the spring belts 25 and 26 are described. This mechanism is shown in FIG. 2 and includes a gear 61 which meshes with the gear 37 and which is also in mesh with a gear 62 for the upper sprocket 11 of the projector. A shiftable gear 64 mounted on one end of an arm 65 pivoted on an axis 66 can be moved to mesh with either the gear 62 or a gear 68 for driving a belt pulley wheel 70 for driving the belt 25 in one direction. On the other end of the arm 65 is a gear 71 which is meshed with the gear 61 when the gear 64 meshes with the gear 68 for normal, forward operation to drive the pulley wheel 69 for the belt 26. The arm 65 is actuated by the lever 30 and is held in either position by springs 72. A chain 73 interconnects the gear 61 and the gear 68 to provide the desired reversal of the reel 6, while the reversal of the motor automatically shifts the puck 46—47 from positive engagement with the flywheel and drum combination during reverse operation of the projector to an inactive or rest position to thereby re-establish a free-running flywheel and drum combination during the normal, forward direction of operation of the projector.

We claim:

1. In a motion picture projector adapted to have a film threaded therein for advancement therethrough, the combination of a plurality of continuously driven sprockets for advancing said film continuously, an intermittent film advancing mechanism between said sprockets, a drum and flywheel unit between said intermittent mechanism and one of said sprockets, said unit being adapted to be engaged by said film and to be rotated by said film as said film is pulled over said unit during advancement thereof, said film being adapted to normally pass in a free loop from said intermittent mechanism to said film-pulled drum and flywheel unit, means for driving said sprockets, gear means coupling said driving means to said sprockets, said driving means being adapted to reverse the rotation of said sprockets, and means interposed between said gear means and said flywheel for connecting said flywheel to said gear means in one direction of rotation of said driving means and to disconnect said gear means from said flywheel in another direction of rotation of said driving means.

2. In a motion picture projector, the combination in accordance with claim 1 in which said last-mentioned means includes an arm, a gear in mesh with said gear means mounted on one end of said arm, a puck driven by said gear, and means at the other end of said arm for moving said puck into and out of engagement with said flywheel in accordance with the direction of rotation of said sprocket driving means.

3. A motion picture film transport mechanism comprising, in combination, reversible driving means, intermittent means for advancing film driven by said driving means, a sprocket, means coupling said sprocket to said driving means for effecting rotation of said sprocket by said driving means selectively in either one or the other of two opposite directions, a film drum and flywheel combination adapted to be engaged by the film and to be rotated thereby in a first direction as the film is pulled thereover by said sprocket upon rotation of said sprocket by said driving means in one of said two opposite directions, and means responsive to said driving means upon reversal of said driving means for effecting rotation of said drum and flywheel combination by said driving means said drum and flywheel combination by said driving means and in the opposite direction from said first direction.

4. A motion picture film transport mechanism in accordance with claim 3 in which said last-mentioned means includes a puck continuously driven by said driving means, and mounting means for said puck adapted to move said puck into engagement with said flywheel in one direction of rotation of said driving means and to disengage said puck from said flywheel in another direction of rotation of said driving means.

5. A motion picture film transport mechanism in accordance with claim 4 in which means are provided between said driving means and said puck for driving said flywheel by said puck faster than said drum and flywheel are rotated by film pulled thereover.

6. A motion picture film transport mechanism adapted to advance a film and to be reversed from normal, forward operation, said mechanism comprising a takeup reel, a supply reel, a pair of continuously rotatable sprockets in the film path between said reels, an intermittent film advancing mechanism between said sprockets, a drum and flywheel combination between said intermittent mechanism and one of said sprockets adapted to be engaged by said film and to be rotated by said film as said film is pulled thereover during advancement thereof, and means for driving said sprockets, said takeup reel, and said intermittent mechanism in normal, forward direction of film travel, said means, when reversed, driving said supply reel, said sprockets, said intermittent mechanism, and also said drum and flywheel combination in the reverse direction from said normal, forward direction of film travel.

7. A motion picture film transport mechanism in accordance with claim 6 in which said means includes a pivoted arm, a gear on one end thereof, a drive gear in continuous mesh with said first-mentioned gear, a puck mounted on said one end of said arm and driven by said gears, and means at the other end of said arm for moving said puck into and out of contact with said flywheel depending upon the direction of rotation of said gears.

8. A motion picture film transport mechanism in accordance with claim 6 in which said driving means includes means for driving said drum and flywheel combination in said reverse direction at a speed higher than the speed of said drum and flywheel when said film is advanced in its normal, forward direction.

9. A motion picture film transport mechanism in accordance with claim 8 in which said driving means includes a pivoted arm, a gear on one end thereof, a drive gear in continuous mesh with said first-mentioned gear, a puck mounted on said one end of said arm and driven by said gears, and means at the other end of said arm for moving said puck into and out of contact with said flywheel depending upon the direction of rotation of said gears.

References Cited in the file of this patent

UNITED STATES PATENTS

| 1,904,411 | Clayton | Apr. 18, 1933 |
|---|---|---|
| 2,142,141 | Morrissey | Jan. 3, 1939 |
| 2,701,690 | Isom | Feb. 8, 1955 |